United States Patent
Lane

(10) Patent No.: US 7,217,368 B2
(45) Date of Patent: May 15, 2007

(54) METHOD AND APPARATUS FOR LIQUID TREATMENT WITH COMBINED ELECTRONIC AND CENTRIFUGAL PROCESSES TO REMOVE CONTAMINANTS

(75) Inventor: John W. Lane, West Hartford, CT (US)

(73) Assignee: Clearwater Systems Corporation, Essex, CT (US)

( * ) Notice: Subject to any disclaimer, the term of this patent is extended or adjusted under 35 U.S.C. 154(b) by 298 days.

(21) Appl. No.: 10/308,647

(22) Filed: Dec. 3, 2002

(65) Prior Publication Data

US 2003/0116506 A1    Jun. 26, 2003

Related U.S. Application Data

(60) Provisional application No. 60/340,055, filed on Dec. 10, 2001.

(51) Int. Cl.
C02F 1/38 (2006.01)
C02F 1/48 (2006.01)
C02F 9/00 (2006.01)

(52) U.S. Cl. ............... 210/787; 210/695; 210/748; 210/806; 210/222; 210/243; 210/252; 210/259; 210/294; 210/512.1; 204/555; 204/557; 204/660; 204/664

(58) Field of Classification Search .......... 210/695, 210/748, 787, 806, 222, 243, 252, 259, 294, 210/512.1; 204/555, 557, 660, 664
See application file for complete search history.

(56) References Cited

U.S. PATENT DOCUMENTS

| 3,637,134 A | * | 1/1972 | Nelson | 494/2 |
|---|---|---|---|---|
| 3,954,611 A | * | 5/1976 | Reedy | 210/223 |
| 4,579,694 A | | 4/1986 | Bradley, Jr. | |
| 5,224,604 A | * | 7/1993 | Duczmal et al. | 210/512.1 |
| 5,527,426 A | * | 6/1996 | Marwah et al. | 210/695 |
| 5,635,068 A | | 6/1997 | Marandi | |
| 6,063,267 A | | 5/2000 | Crewson et al. | |
| 6,355,178 B1 | * | 3/2002 | Couture et al. | 210/787 |
| 6,743,365 B1 | * | 6/2004 | Marlowe | 210/223 |

OTHER PUBLICATIONS

Lane, John et al., "Condenser Water Treatment Using Pulsed Power," 2003 Cooling Technology Institute Annual Conference, San Antonio, TX.
Affidavit of John Dresty, four (4) pages, Mar. 27, 2006.
Affidavit of John W. Lane, six (6) pages, Mar. 16, 2006.
Clearwater Systems, "Chemical-Free Treatment of Recirculating Water Using Pulsed-Power".
Goldsworthy et al., "Biological Effects of Physically Conditioned Water", Biology Dept., Imperial College of Science Technology and Medicine, vol. 33, No. 7, pp. 1618-1626, 1999.
Baker et al., "Magnetic Amerlioration of Scale Formation", School of Water Sciences, Cranfield University, vol. 30, No. 2, pp. 247-260, 1996.
Donaldson et al., "Lifting the Scales from our Pipes", New Scientist Feb. 18, 1988.

(Continued)

*Primary Examiner*—David A Reifsnyder
(74) *Attorney, Agent, or Firm*—Michaud-Duffy Group LLP

(57) ABSTRACT

An apparatus and method for treating dirty water or other liquids containing particles of varying size includes a magnetic treatment unit and a centrifugal separator through which the liquid flows as a stream in sequence. The magnetic treatment unit causes very small sized particles to agglomerate, nucleate or otherwise to be amassed into larger particles which are then more easily separated by the centrifugal separator.

17 Claims, 1 Drawing Sheet

OTHER PUBLICATIONS

Figure 1:
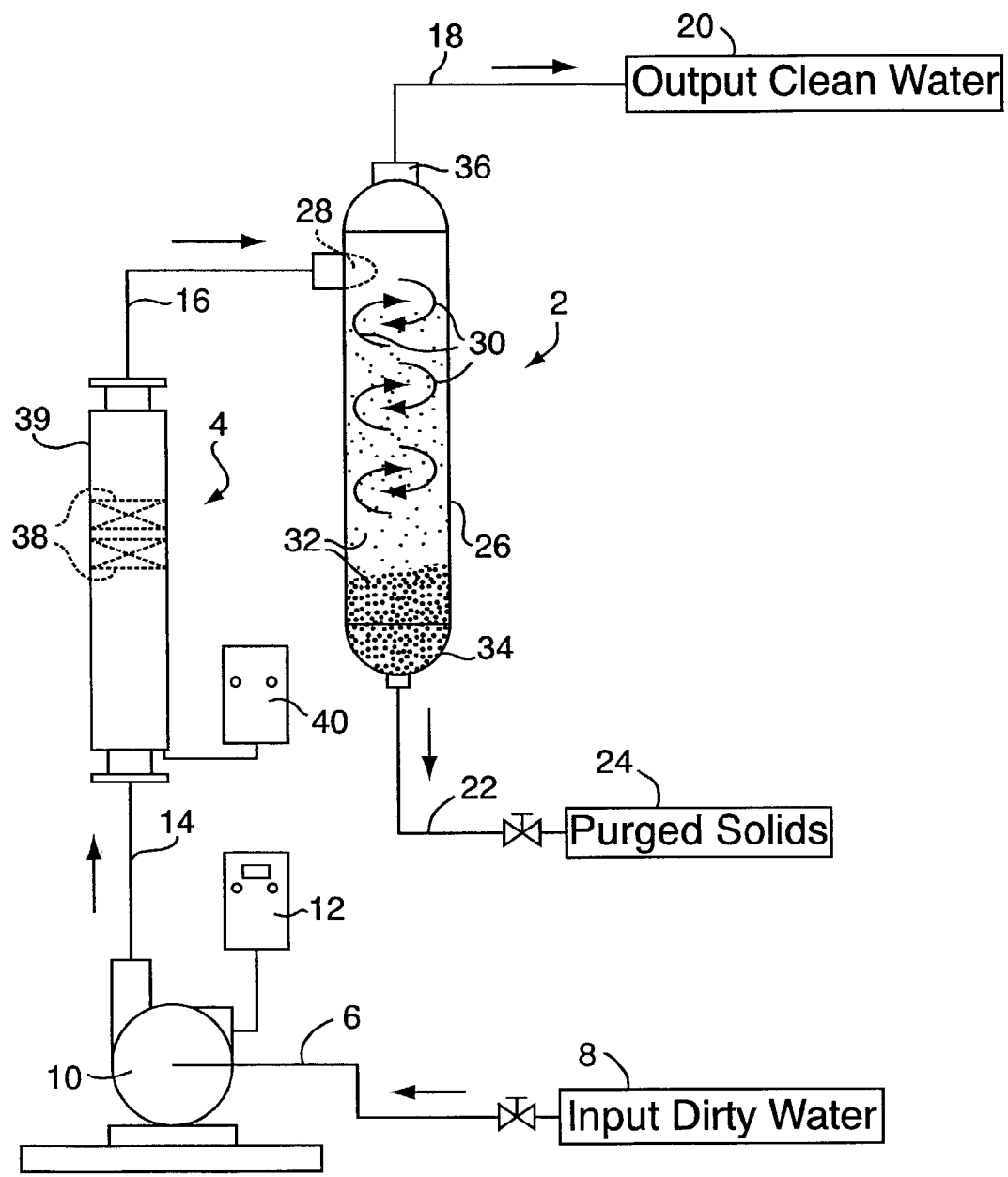

Publication from Federal Technology Alert, DOE/EE-0162 Non-Chemical Technologies for Scale and Hardness Control-Published Jan. 1998.

Publishcation from Cranfield University, Mag 3, Apr. 14, 1999 entitled Overview of Recent Magnetic Treatment Research at Cranfield University.

* cited by examiner

METHOD AND APPARATUS FOR LIQUID TREATMENT WITH COMBINED ELECTRONIC AND CENTRIFUGAL PROCESSES TO REMOVE CONTAMINANTS

CROSS REFERENCE TO RELATED APPLICATION

This application is a nonprovisional application claiming an invention disclosed in prior U.S. provisional application No. 60/340,005, filed on Dec. 10, 2001, and names as the inventor the same inventor as named in said provisional application, whose invention is claimed in the claims of this application. The benefit of the Dec. 10, 2001 filing date of the provisional application is claimed for this nonprovisional application and the content of said provisional application is hereby incorporated into this application by reference.

FIELD OF THE INVENTION

This invention relates to the treatment of water and other liquids to remove contaminants, and deals with a method and related apparatus whereby electronic and centrifugal treatment processes are combined to enable the efficient removal, among other contaminants, of solids and particulates having a range of sizes which range includes sizes much smaller than those previously removable without exceptional expense and effort.

BACKGROUND OF THE INVENTION

Solids and other harmful contaminants and particulates, including dissolved minerals and organic matter in process water streams have devastating effect on equipments and environment. Present use of water treatment chemicals to maintain contaminants in solution in water have done much damage with substantial side effects. Conventional types of centrifugal separators or hydrocyclones, cannot provide a positive solution in removing micronic pollutants. The water treatment/filtration method and device of this invention have been proven to be "the solution" to these problems. It is well established that the efficiency of centrifugal separators is dependent on the density, size and shape of the particles to be removed, and that under the best conditions the smallness of the particles capable of being removed, at reasonable expense, is limited to about 40 microns. In contrast to this, with the method and apparatus of this invention particles much smaller than 40 microns can be effectively removed. Particles as small as 20 microns have been effectively removed to date, and it is expected that even smaller sizes may be removed in the future.

BRIEF DESCRIPTION OF THE DRAWINGS AND EXHIBITS

The single FIGURE, FIG. 1, of the drawing shows an apparatus embodying the invention and usable in practicing the method of the invention.

DETAILED DESCRIPTION OF THE PREFERRED EMBODIMENT

Referring to FIG. 1, the illustrated apparatus, comprising an exemplary embodiment of the invention, includes basically a centrifugal separator 2, a high frequency magnetic flux treatment unit 4, and a flow system for causing impure dirty liquid, which may be and is hereinafter referred to as "water", to pass first through the magnetic flux treatment unit 4 and then through the centrifugal separator 2. In the illustrated case the flow system includes an input pipe 6 for conveying water from a source 8 of dirty water to a pump 10 having a controller 12, a pipe 14 conveying water from the pump 10 to the treatment unit 4, a pipe 16 conveying water from the treatment unit 4 to the separator 2, and an output pipe 18 conveying clean water from the separator 2 to a clean water delivery station 20. A solids purge pipe 22 is also connected to the separator 2 to convey solids removed from the water by the separator 2 to a purged solids delivery station 24.

The centrifugal separator 2 may be any one of known commercially available separators which operate to mechanically separate solids and particles from water flowing through the separator, as by causing the water in the separator to swirl in a circular path centrifugally forcing solids and particles to a radially outward position from which they are separated, collected and purged from the water. Preferably, the separator, as described in more detail hereinafter, is one such as sold by Griswold Separators of 2803 Barranca Parkway, Irvine, Calif. 92606, under model designation CSS (automatic purge) or CSP (closed loop recovery), or one such as shown by U.S. Pat. No. 5,635,068, the disclosure of which is included herein by reference.

The illustrated separator 2 has a generally cylindrical and vertically oriented separator tank 26 to the top of which dirty water is introduced through a tangential opening 28 to cause a swirl or vortex in the tank, as indicated by the arrows 30, forcing solid particles 32 in the water radially outwardly to a region adjacent the vertical cylindrical wall of the tank from which region they fall downwardly to a collection chamber 34 from which they are periodically or continuously purged, with water freed of these particles moving upwardly through an upper outlet 36 of the tank 26 to the output pipe 18.

The treatment unit 4 is one which treats water flowing through it to oscillating magnetic flux created by one or more electrically excited coils 38 through which the dirty water passes and forming part of a pipe unit 39, with the excitation of the coil or coils being controlled by a control unit 40.

The treatment unit 4 is preferably one whereby the oscillating magnetic flux applied to the water is one having a high frequency within the range of 10 kHz to 100 kHz and which appears in time spaced bursts having a burst repetition rate of up to 150 bursts per second. For example the unit 4 may be one as sold by Clearwater Systems, LLC of 145 Dennison Road, P.O. Box 463, Essex, Conn. 06426 under the series name "DOLPHIN", or as shown by U.S. Pat. No. 6,063,267, the disclosure of which is incorporated herein by reference.

Having now described the subject apparatus, its operation may be given as follows.

A stream of water laden with dissolved minerals and solids from condensers, chillers, cooling towers, boilers, heat exchangers, and other sources of used water (e.g. rotating equipment glands or mechanical seals cooling/flushing water, water for distribution spray nozzles for contact cooling and agriculture, etc., is directed to the apparatus from the dirty water supply 8. The pump 10 conveys this stream with positive pressure to the magnetic treatment unit 4 where the surface charges and/or hydration layer on colloidal and/or suspended particles of less than 45 micron size are changed, with the result that these small particles then can and do coagulate into large particles. The stream laden with the coagulated or nucleated particulates and other large particles already in the water upstream of the unit 4, then enters the centrifugal separator 2 through the tangential inlet 28 forcing the solids to move toward the inside surface of the cylindrical wall of the tank 26. The centrifugal force created by the swirling motion of the stream produces a clean vortex in the separator chamber and maintains a helical downwardly moving path of the solids into the collection chamber 34. Solids in this chamber settle calmly until they are purged, manually or automatically, by timer or other means, to the solids delivery station 24.

The water of the clean vortex created in the middle of the separator tank 26 moves upwardly toward and through the outlet 36, from which the outlet pipe 18 conducts it to the clean water delivery station 20 for further use or storage.

The agglomeration and nucleating effect of the magnetic treatment device 4 makes the very small particles of the dirty water into bigger and heavier particles which are easier for the centrifugal separation subsequently carried out by the centrifugal separator 2. The resulting effect is a very clean output water from which solids and particulates of even very small size (e.g., less than 40 microns) have been substantially reduced.

The effectiveness of the method and apparatus of the invention has been proven by tests made to determine the separation effectiveness achieved in handling test samples of dirty water both by a given centrifugal separator alone and by the same centrifugal separator preceeded by a magnetic treatment unit in accordance with the invention described above. The results of these tests are given by the following Table 1.

TABLE 1

IMPROVEMENT IN SEPARATION EFFICIENCY COMPARING SEPARATION USING ONLY CENTRIFUGAL SEPARATOR AND SEPARATION USING COMBINATION OF MAGNETIC TREATMENT UNIT AND CENTRIFUGAL SEPARATOR.

| Particle Size Microns | Centrifugal Separator Only Particle Distribution | Combination Particle Distribution | Centrifugal Separator Only Normalized to 100 g Total | Combination Normalized to 69 g >74 micron | Improvement with Combination |
|---|---|---|---|---|---|
| >74 | 69% | 64% | 69% | 69.0 | |
| <74 | 31% | 36% | 31 | 38.8 | 25% |
| <34 | 18% | 26% | 18 | 28.0 | 56% |
| <19 | 8% | 11% | 8 | 11.9 | 48% |
| <9 | 4% | 8% | 4 | 8.6 | 116% |
| <5 | 4% | 6% | 4 | 6.5 | 62% |
| <2 | 3% | 4% | 3 | 4.3 | 44% |
| <1 | 2% | 2% | 2 | 2.2 | 8% |

What is claimed:

1. A method for treating a liquid having solid particulate contaminants suspended therein to remove solid particulate contaminants within a size range including very small sizes, said method comprising the steps of:
providing an input stream of said liquid having solid particulate contaminants suspended therein;
moving said liquid having solid particulate contaminants suspended therein from said input stream through a treatment zone;
creating coagulated particles by subjecting said liquid having solid particulate contaminants suspended therein to a high frequency magnetic flux as said liquid having solid particulate contaminants suspended therein moves through said treatment zone, thereby causing at least a portion of said solid particulate contaminants to agglomerate into said coagulated particles; and
moving said liquid with all of said coagulated particles and all of any remaining solid particulate contaminants still being suspended in the liquid directly through a centrifugal separator to remove said coagulated particles and said remaining solid particulate contaminants from said liquid.

2. The method of claim 1 wherein:
said high frequency flux is a flux having a frequency of 10 kHz to 100 kHz.

3. The method of claim 1 wherein:
said liquid is moved through said treatment zone along a given path, and
said high frequency magnetic flux is produced by at least one electrically excited coil surrounding said path.

4. The method of claim 1 wherein;
said high frequency magnetic flux is produced in the form of time spaced bursts at a burst repetition rate of up to 150 bursts per second.

5. An apparatus for liquid treatment, said apparatus comprising
a magnetic treatment unit;
a centrifugal separator for separating material from a liquid having suspended material, and
a pipe system for causing said liquid with said suspended material to flow in a stream passing first through said magnetic treatment unit and then said liquid with all of said suspended material still being in said liquid passing directly through said centrifugal separator, and wherein
said magnetic treatment unit selectively subjects said material suspended in said liquid with high frequency magnetic flux, said high frequency magnetic flux having a frequency for changing surface conditions of said material suspended in said liquid such that said material adheres to form agglomerations of coagulated particles which are then separated from said liquid in said centrifugal separator.

6. An apparatus for liquid treatment as defined in claim 5, wherein:
said magnetic treatment unit includes at least one electrically excited coil surrounding said stream for creating said high frequency magnetic flux.

7. An apparatus for liquid treatment as defined in claim 6, wherein:
said magnetic treatment unit includes a control unit to electrically excite said at least one coil so that said high frequency magnetic flux has a frequency with the range of 10 kHz to 100 kHz.

8. An apparatus for liquid treatment as defined in claim 7, wherein:
said control unit excites said at least one coil such that said high frequency magnetic flux appears in time spaced bursts having a burst repetition rate of up to 150 bursts per second.

9. An apparatus for liquid treatment as defined in claim 7, wherein:
said control unit excites said at least one coil such that said high frequency magnetic flux oscillates in time spaced bursts having a burst repetition rate of up to 150 bursts per second.

10. An apparatus for liquid treatment as defined in claim 5, wherein:
said centrifugal separator is one wherein said liquid of said stream is caused to flow in a circular path to produce a centrifugal force urging particles in said liquid to move radially outwardly to a radially outer region.

11. An apparatus for liquid treatment as defined in claim 10, wherein:
said centrifugal separator includes a vertically oriented cylindrical tank to an upper end of which the liquid stream is introduced through a tangential inlet opening in the tank, the tank having an outlet opening above the tangential inlet opening through which cleaned liquid is removed from the tank, and the tank further having a bottom end spaced below said tangential inlet opening and forming a chamber for collecting particles separated from the liquid of the introduced stream.

12. An apparatus for liquid treatment as defined in claim 5, wherein said changing surface condition includes at least one of surface charges and hydration layers on colloidal and suspended material in said liquid.

13. A. An apparatus for liquid treatment as defined in claim 5, wherein said centrifugal separator separates material from said liquid to be treated within a first size range of at least about 40 microns and said coagulated particles are formed from at least one of material within said first size range adhering to material within a second size range that is less than about 40 microns, and material within said second size range adhering to other like sized material.

14. An apparatus for liquid treatment as defined in claim 13, wherein said second size range is from about 1 to 40 microns.

15. An apparatus for liquid treatment as defined in claim 13, wherein said second size range is from about 20 to 40 microns.

16. An apparatus for liquid treatment, said apparatus comprising
a magnetic treatment unit;
a centrifugal separator for separating material from a liquid having colloidal and suspended material, and
a pipe system for causing said liquid with said colloidal and suspended material to flow in a stream passing first through said magnetic treatment unit and then said liquid with all of said colloidal and suspended material still being in said liquid passing directly through said centrifugal separator, and wherein
said magnetic treatment unit selectively subjects said colloidal and suspended material suspended in said liquid with high frequency magnetic flux, said high frequency magnetic flux having a frequency for changing at least one of surface charges and hydration layers on said colloidal and suspended material in said liquid to form agglomerations of coagulated particles which are then separated from said liquid in said centrifugal separator.

17. An apparatus for liquid treatment as defined in claim 16, wherein said colloidal and suspended material is of less than about 45 micron size and said coagulated particles are larger than about 45 micron size.

* * * * *

(12) INTER PARTES REEXAMINATION CERTIFICATE (0417th)
United States Patent
Lane

(10) Number: US 7,217,368 C1
(45) Certificate Issued: Aug. 7, 2012

(54) METHOD AND APPARATUS FOR LIQUID TREATMENT WITH COMBINED ELECTRONIC AND CENTRIFUGAL PROCESSES TO REMOVE CONTAMINANTS

(75) Inventor: John W. Lane, West Hartford, CT (US)

(73) Assignee: Clearwater Systems Corp., Essex, CT (US)

Reexamination Request:
No. 95/001,147, Feb. 18, 2009

Reexamination Certificate for:
Patent No.: 7,217,368
Issued: May 15, 2007
Appl. No.: 10/308,647
Filed: Dec. 3, 2002

Related U.S. Application Data
(60) Provisional application No. 60/340,055, filed on Dec. 10, 2001.

(51) Int. Cl.
*C02F 1/38* (2006.01)
*C02F 1/48* (2006.01)
*C02F 9/00* (2006.01)

(52) U.S. Cl. .............. 210/787; 210/222; 210/243; 210/252; 210/259; 210/294; 210/512.1; 210/695; 210/806; 204/555; 204/557; 204/660; 204/664

(58) Field of Classification Search .................. None
See application file for complete search history.

(56) References Cited

To view the complete listing of prior art documents cited during the proceeding for Reexamination Control Number 95/001,147, please refer to the USPTO's public Patent Application Information Retrieval (PAIR) system under the Display References tab.

*Primary Examiner* — Krisanne Jastrzab

(57) ABSTRACT

An apparatus and method for treating dirty water or other liquids containing particles of varying size includes a magnetic treatment unit and a centrifugal separator through which the liquid flows as a stream in sequence. The magnetic treatment unit causes very small sized particles to agglomerate, nucleate or otherwise to be amassed into larger particles which are then more easily separated by the centrifugal separator.

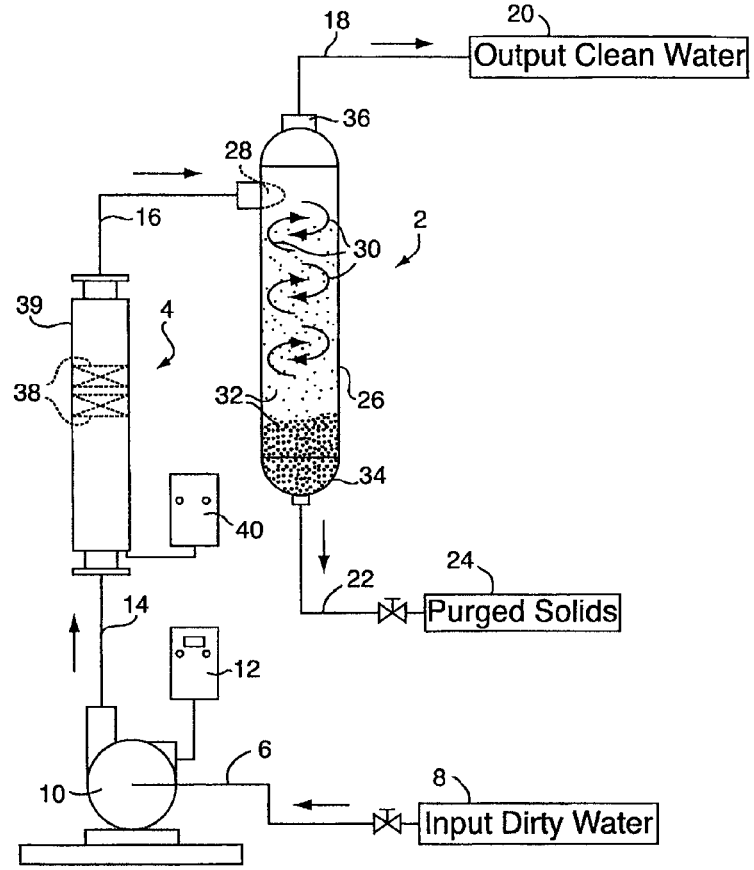

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-17 are cancelled.

* * * * *